United States Patent Office 3,129,405
Patented Apr. 14, 1964

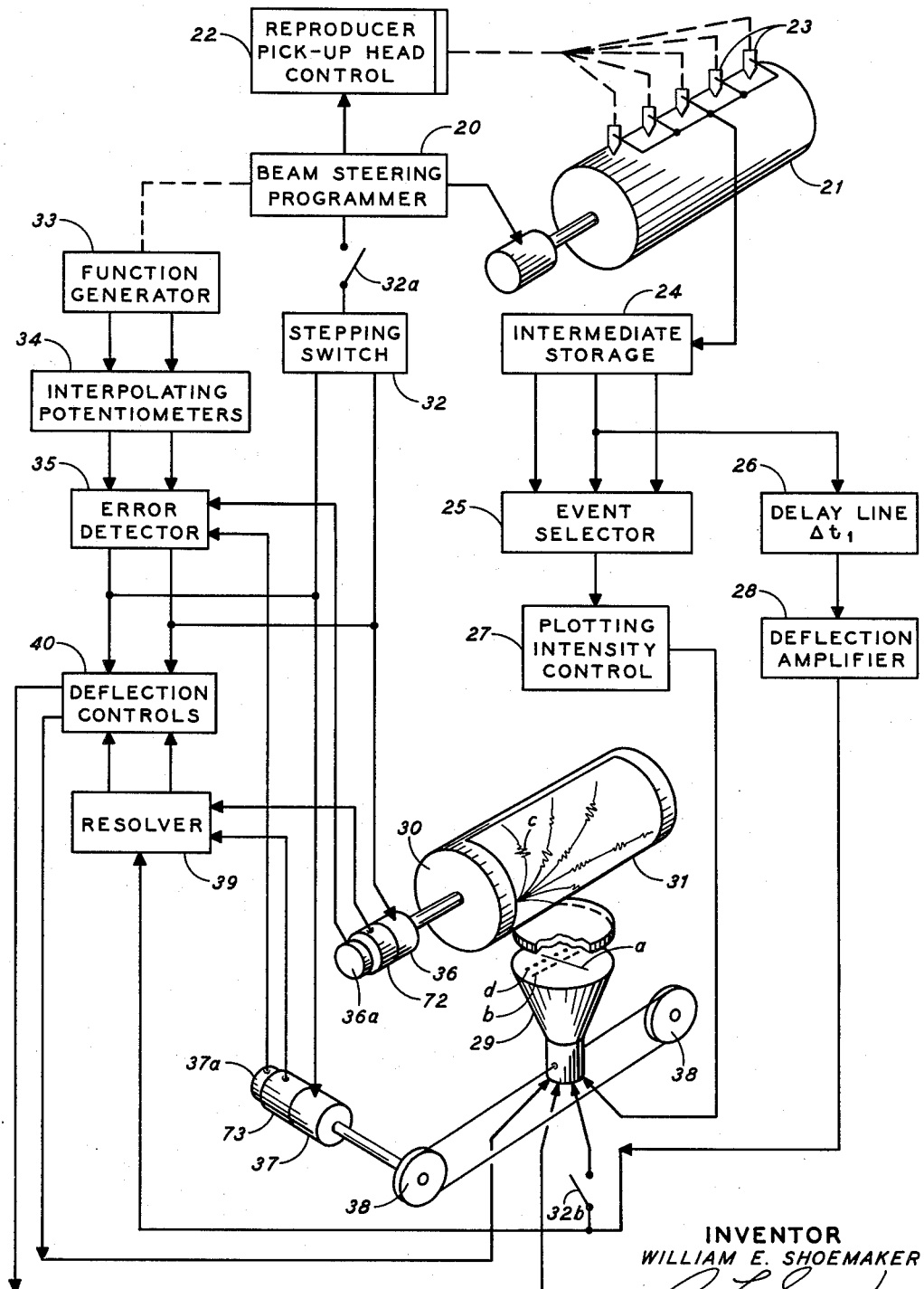

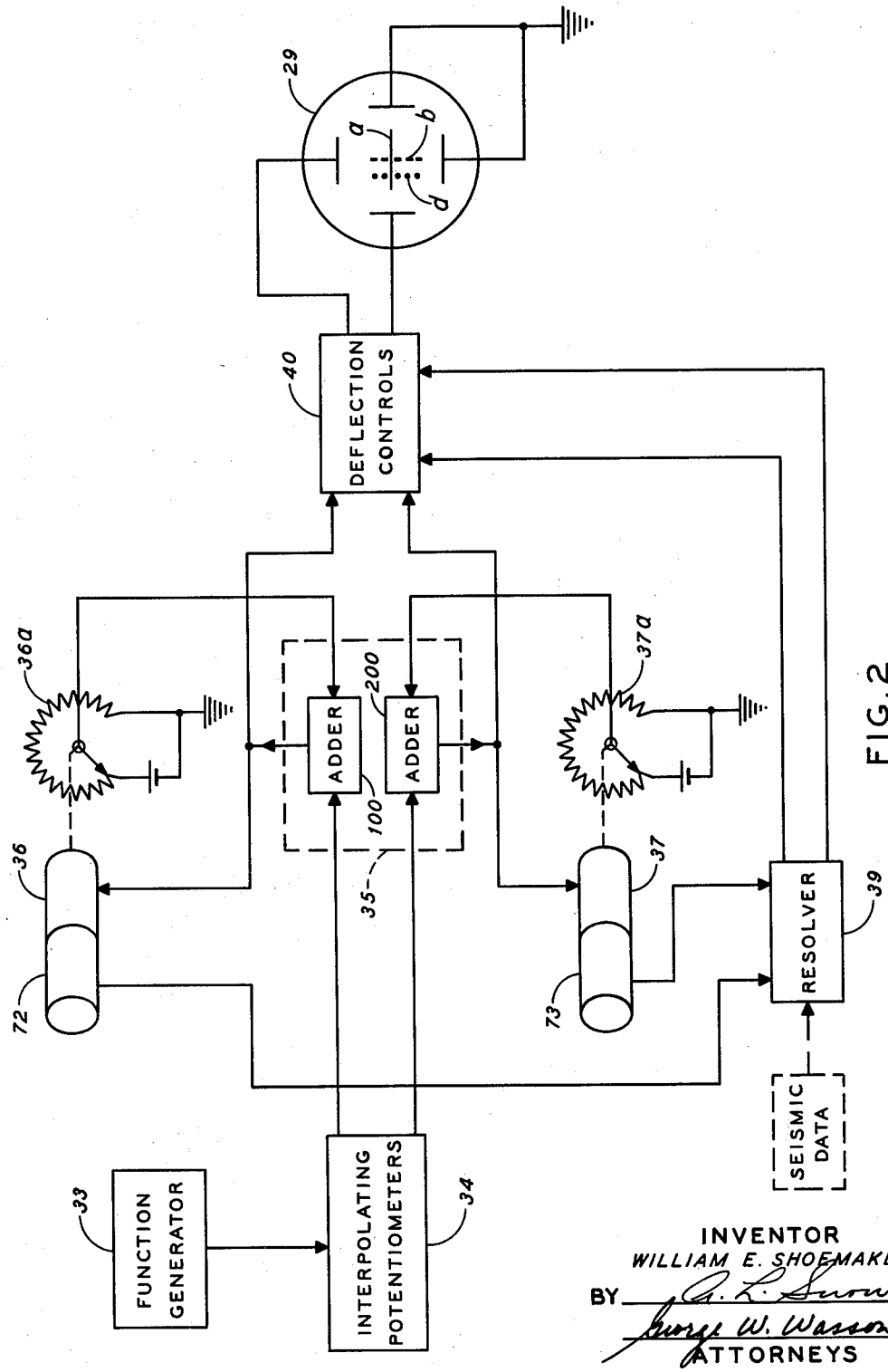

3,129,405
VERY FAST SERVO PLOTTER
William E. Shoemaker, Fullerton, Calif., assignor to California Research Corporation, San Francisco, Calif., a corporation of Delaware
Filed Sept. 28, 1959, Ser. No. 842,844
5 Claims. (Cl. 340—15.5)

This invention relates to a servo follow-up system and more particularly to a servo system employed with an optical plotting apparatus having an oscillographic source of light, as for instance, a cathode ray oscilloscope, and wherein servo compensating voltages are applied to the cathode ray oscilloscope to provide a substantially inertialess servo follow-up system.

The object of the present invention is a rapidly operating servo follow-up system wherein the effect of inertia within the system is eliminated.

Other objects and features of the present invention will be fully apparent to those skilled in the art from the specification and the appended drawings illustrating a certain preferred embodiment in which:

FIG. 1 is a block diagram of a plotting apparatus employing an oscillographic source of light with an inertialess light beam;

FIG. 2 is a schematic diagram of the servo followup system of the present invention.

In the copending applications of Lee P. Stephenson, Serial No. 803,906, filed April 3, 1959, for Automatic Seismic Data Processing Method and Apparatus, and the application of W. W. Klein, Jr., et al., Serial No. 843,221, filed September 29, 1959, for Seismic Cross-Section Plotter, an apparatus and method have been disclosed for the plotting of seismic data in the form of both migrated seismic sections and in the form of parallel traces of directional seismic information. In the plotting of the seismic data as derived from a conventional seismic record, particularly in the form of migrated seismic traces, it is essential that the data supplied for display be plotted in accurate displacement along migrated seismic ray paths usually emanating from a reference point associated with a shot point position generally on the earth's surface. The display of the seismic data in migrated form takes on the appearance of a plurality of curving lines within a plane emanating from the reference point and passing into the subsurface formations of the plane in the paths of seismic energy within said formation. The curving of the migrated lines is a function of the difference in velocity of transmission within the various earth's formations and the computation of the curvature of these lines is well known to those skilled in the art and has been well summarized in publications, such as, by H. Kaufman, "Velocity Functions in Seismic Prospecting," Geophysics, vol. 18 (1953), page 289 et seq. Where an earth formation is made up of a series of parallel bedding planes, all substantially parallel to the earth's surface, the energy traveling vertically down into the earth formation will continue to travel in a substantially straight line, whereas energy traveling an angles other than vertical to the earth's surface will strike the bedding planes at an angle other than vertical and when passing from a first layer of lower velocity into a second layer of higher velocity, the energy ray path will assume a higher angle of divergence from vertical, and a representation of several ray paths will take on the appearance of divergently curving lines in a fan-like display.

Curvatures of migrated seismic energy ray paths are usually gentle; however, where large discontinuities in acoustic impedance are encountered, changes in direction may become extremely rapid. Even where these rapid changes take place, it becomes important to plot seismic data in their precise positions, and to accomplish this precise plotting the apparatus employed to plot the data must respond instantaneously to commands for directional changes. Furthermore, as the speed of the plotting apparatus is increased the momentum of the individual components of the plotting apparatus becomes of concern since rapid changes in direction must be accomplished at even higher rates of change.

The present invention is designed to provide a system for compensating for positioning errors in the plotting of seismic data. Through the use of the present invention the plotting apparatus is relieved of the effect of both inertia and momentum on its operation so that the apparatus may provide for accurate plotting of the seismic data. The present invention also permits improvements in the design of the plotting apparatus with which it is associated in that lower powered motors are now required in positioning of the plotter components since the rapid changes in direction and rates of motion are now to be handled by the servo system operating on a substantially inertialess portion of the plotter.

A plotting device incorporating the present invention is shown in block diagram form in FIG. 1. The plotter constitutes an apparatus designed to plot both sonograph and migrated displays of directional seismic traces. Within the plotter, a programmer 20 energizes a motor for the drive of a reproducible record drum 21 on which records of the outputs of individual surface geophones indicating the earth's surface movement in response to a seismic disturbance have been recorded. These records constitute locational seismic data being the signals received by each geophone at its particular location. These originally recorded records are latter combined in a plurality of different time-lagged combinations to produce a plurality of directional seismic traces in the manner fully described in the aforementioned copending application of Lee P. Stephenson, Serial No. 803,906. In the combining of the records to produce the directional seismic traces employed for the migrated display of seismic data, the programmer 20 energizes a reproducer pickup head control 22 for adjustably positioning a plurality of reproducer heads 23 being movable about the periphery of the recording drum for establishing appropriate time delays between adjacent trace reproductions to extract the directional information contained within the traces. The reproducer pickup head control 22 may also have incorporated into it the function of positioning the pickup heads to supply conventional time corrections to the reproduction of locational seismic traces to take into consideration the relative vertical and horizontal spacing of geophones and other fixed time corrections normally applied to seismic records. With each complete revolution of the recording drum 21, a separate directional seismic trace will be produced, each trace being a different time lag combination of the several locational seismic traces. Each of the separate directional seismic traces will then be supplied to an intermediate storage device 24 rotating in synchronism with the recording drum 21. It should be understood that the intermediate storage device 24 may be provided either with a capacity to store the entire number of directional seismic traces to be included in a sonograph record or, since the signals will be analyzed through the comparison with signls developed on neighboring seismic traces the intermediate storage device may be designed to store only that number of directional traces necessary for the analysis of each record for actuation of the remainder of the plotting apparatus.

The signals as stored in the intermediate storage device 24 will be transmitted to an event selector 25 as more fully defined in the copending application of Walter W. Klein, Jr., and Lee P. Stephenson, Serial No. 842,621, filed September 28, 1959, for Information Selection Programmer. In the event selector 25, a plurality of directional seismic traces are compared in absolute amplitude, relative amplitude and time coherence to select meaningful events on the record. The input to the selector is shown as three separate inputs constituting the center trace and traces to either side of a particular set of directional seismic traces for the identification of meaningful directional seismic information. The separate inputs may constitute either the central and next adjacent traces from the central trace or the central trace and outer traces spaced by one from the central trace. The central trace will also be applied to a delay line 26 where the information in the directional seismic trace under analysis will be delayed in an appropriate amount to permit the comparison of the trace, at the central portions of seismic events within the trace, while permitting the control of the plotting of a seismic event to begin from some time period prior to the most interesting central portion of an event. The event selector 25 will energize a plotter intensity control 27 to permit energization of a plotting device only when a suitable event has been selected for plotting. The selector 25 or the intensity control 27 may also include a holding circuit that will permit the continued plotting of a selected event within the directional trace for an adjustable period after the last satisfaction of the event selection criteria.

When an event has been selected, the intensity control 27 will energize the plotting device, herein illustrated as a cathode ray tube 29, with suitable voltages to intensify the electron beam of the tube. The signal applied to the tube from the deflection amplifier 28 will then deflect the electron beam of the tube in accordance with the oscillations of the delayed signal from the intermediate storage device 24. The holding control mentioned above will continue suitable energization for the cathode ray tube 29 for an adjustable period designed to include the trailing edge of an event as it is being analyzed in the event selector 25. The directional seismic traces as stored in the intermediate storage device 24 will thus be projected toward a display surface 31 mounted on a rotatable drum 30 to be photographically plotted as records of oscillating traces in varying degrees of intensity to illustrate the events within the directional trace with the events of particular significance dominating the remainder of the trace. The discarded events may be plotted either as dotted lines or in other forms of less dominance or may be eliminated entirely should this be desired.

The relative movement between the cathode ray tube 29 and the rotatable drum carrying the display surface 31 may be accomplished in either of two fashions. The directional seismic traces may be plotted in a migrated form, as shown on the display surface 31 of FIG. 1, or the traces may be plotted as parallel traces without taking into consideration the directionality of each of the individual traces. To permit the parallel trace display, a stepping switch 32 is provided for connection to the beam steering programmer 20 to provide for movement of the display surface in accordance with the original program to the pickup heads on the recording device 21. In the display of the data in migrated form the directional seismic traces are plotted from a reference point related to a datum plane within the earth's surface and follow the ray path of seismic energy through the earth formations being surveyed. The migrated display of seismic data in the form of directional seismic traces may be considered as a ray path plot of the seismic reflection data with each trace emanating from the reference point at or near the earth's surface.

To provide for the display of the directional seismic data migrated in accordance with subsurface velocity variations of the earth formation being surveyed, the plotting device of the present invention includes ray path resolution apparatus for the control of the related movement and position of the plotting surface 31 with respect to the cathode ray tube 29. To accomplish the relative movements necessary, certain initial subsurface velocity information may be supplied from suitable punch-card information for interpretation by a punch-card reader 33. The information contained on the punched cards will be sensed and converted to command voltages necessary for the relative positioning of the plotting device and the cathode ray tube by suitable interpolating potentiometers 34. The command voltages will be applied to an error detector 35 where a comparison will be made with voltages representing the present position of the drum 30 and the cathode ray tube 29 derived from position potentiometers 36a and 37a, respectively. If there is an error signal derived from the comparison of the command and position voltages, the error signal will be supplied to the motor 36 to rotate the drum 30 and to motor 37 for positioning the cathode ray tube 29 by rotation of pulleys 38 connected by cable to the cathode ray tube. In this manner, as each directional trace is produced and analyzed, the ray path information contained on an appropriate punch card will initiate energization for motors 36 and 37 to provide for the proper X and Z coordinate displacements of the display surface 31 with respect to the oscilloscope 29.

The servo follow-up system of the present invention is designed to permit the motors 36 and 37 to be of reasonably small size while the instantaneous error is removed by the substantially inertialess electron beam on the oscilloscope. It should be apparent that for each set of ray path data on the punch cards used for establishing the migration of the ray paths, there will be an instantaneous command forwarded to the error detector 35 of the plotting device. Between the increments of digital data on the punch cards the interpolating potentiometers 34 will smooth out the commands but, whenever a sharp or fast movement is required, there will always be some finite period required for the response and for movement to the newly-commanded position. A motor system capable of handling the instantaneous movement requirements would be, of necessity, a system designed for high power requirements even though the individual components might be of small weight. On the other hand, with the apparatus of the present invention, the need for high power motors is eliminated by sensing the error between the command position as interpolated by the potentiometers 34 and the instantaneous position of the plotting elements by potentiometers 36a and 37a and then modifying the deflection voltages of the oscilloscope 29 to position the electron beam of the oscilloscope in accordance with the commanded position. In this manner any error in position is corrected by a movement of the intertialess electron beam and the seismic data supplied to the oscilloscope from the intermediate storage device 24 is plotted substantially exactly in the position commanded by the punch card digital data.

The foregoing servo follow-up function is performed by the error detector 35 as energized by position sensing devices 36a and 37a associated with the motors 36 and 37, respectively. Any output from the sensed error between interpolated command positions and actual position is supplied as additional input to the deflection control 40. In FIG. 2 of the drawings, a schematic diagram of the servo follow-up system of the present invention is shown with the elements of FIG. 1 identified by the same numbers. In the circuit diagram of FIG. 2 the function generator 33 and interpolating potentiometers 34 supply command voltages to a pair of adders 100 and 200 constituting the error detector 35 of FIG. 1. A second input is supplied to the adders 100 and 200 from the position potentiometers 36a and 37a, respectively. In the adders, the two input voltages are compared and any error signal that exists is provided as energization to the motors 36 and 37 for moving the drum 30 and oscilloscope 29, respectively. The symbols $X(t)$ and $-X_0(t)$ are associated with the adder 100 to indicate that the position signal from the potentiometer 36a will be subtracted, by adding the negative quantity, from the command voltage to provide a signal to both the deflection controls 40 and the motor 36 of the difference in position and command. As with the plotting apparatus of FIG. 1, the seismic data, here shown as a dotted block and constituting the analyzing apparatus of FIG. 1 including the reproducer 21, storage 24, selector 25 and delay line 26, is supplied as input to the resolver 39 where the signals are modified to provide for appropriate directional deflection of the electron beam in accordance with the position of the seismic data along the migrated ray paths. The modification is controlled by the rate of travel of the drum and oscilloscope as determined from the tachometers 72 and 73. The resolver 39 maintains the seismic event excursions perpendicular to each ray path as it is being plotted and is more fully explained in the copending application of Walter W. Klein, Jr., Serial No. 842,835, filed September 28, 1959, for Method and Apparatus for Generating Varying Functions. The output of the resolver 39 is fed to the deflection control 40 and constitutes the input seismic data multiplied by sine and cosine functions as required to deflect the electron beam of the oscilloscope 29 in the prescribed direction so that events as they are plotted along the migrated ray paths will at all times be perpendicular to the instantaneous direction of travel of the migrated ray path. The deflection control 40 modifies the already modified signal from the resolver 39 to position the electron beam so that its center of excursion will be in the position along the migrated ray path as prescribed by the function generator 33. That is, if there is an error in position of the drum 36 with respect to its commanded position from the potentiometer 34, the error will be determined by the adder 100 and an appropriate compensation will be supplied to the deflection control 40 that will cause the electron beam of the cathode ray tube 29 to be moved to the left or right of center of the face of the cathode ray tube as shown in FIG. 2.

On the face of the oscilloscope 29 in FIGS. 1 and 2, the effect of the present invention is graphically illustrated. Solid line $a$ is intended to illustrate the unmodified excursion path for the electron beam in displaying an input seismic event. Dashed line $b$ illustrates the excursion path at it might appear for a highly modified event, as for instance, an event at $c$ on the display surface 31. Dotted line $d$ illustrates the further modification of the deflection path of the electron beam of the oscilloscope when an error in position is detected by the error detector 35 with the error herein illustrated being detected in adder 100 and indicating a position error for the motor 36 and drum 30. To compensate for the error, the deflection path of the beam has been moved to the left of center, as viewed in FIG. 2, so that the actual plotting of a selected event will be ahead of where the drum and oscilloscope would have otherwise plotted the event.

It may now be seen that through the operation of the present invention, high powered follow-up servo systems have been eliminated and the positioning of the displayed seismic data is provided in its correct position through compensation of positioning of the substantially inertialess electron beam of an oscilloscope. It should be understood that while the invention has been described as applied to an apparatus for the plotting of seismic data, the servo compensating system has many other applications wherever the display of input information is plotted by relatively moving display surfaces and light sources and wherever the light beam of the light source may be moved independently of movement of the light source.

While a certain preferred embodiment of the invention has been specifically disclosed, it should be understood that the invention is not limited thereto as many variations will be readily apparent to those skilled in the art and the invention is to be given its broadest possible interpretation within the terms of the following claims.

I claim:

1. In a seismic section plotting means including a drum display surface rotatable about an axis longitudinal of said drum, a cathode ray tube movable parallel of the axis of rotation of said drum, and a preprogramed energization means for said plotting means for causing movement of said drum and cathode ray tube to plot seismic data on said display surface, the improvement comprising means for sensing the instantaneous position of said drum and said cathode ray tube, means for comparing said sensed instantaneous positions to said preprogramed energization including means for establishing an indication of error therebetween, and means for deflecting the beam of said cathode ray tube in accordance with said error indication to eliminate the effect of inertia in said drum and cathode ray tube from said plotting of seismic data on said display surface.

2. Means for compensating for an error in position between a movable display surface and a plotting cathode ray tube movable with respect to said display surface comprising a motor for moving said display surface, a motor for moving said cathode ray tube, preprogramed command signals for determining energization for said motors, a potentiometer being moved by each of said motors, said potentiometers establishing electrical indications of the instantaneous position of said display surface and said cathode ray tube, means for comparing said electrical indications to said preprogramed command signals including means for establishing an electrical indication of the error therebetween, means for controlling said motors in accordance with respective electrical indications of error in command and instantaneous position, and means for deflecting the beam of said cathode ray tube in accordance with said error indications to instantaneously position said beam with respect to said display surface.

3. In a plotting apparatus including a movable light beam producing light source and a display surface containing a photosensitive surface to which said light beam is directed, said light source and display surface being movable with respect to each other, the improvement constituting means for eliminating the effect of inertia in moving said light source and display surface with respect to each other comprising means for causing movement of said light source, means for causing movement of said display surface, means for energizing said movement causing means, means for sensing the relative position of said light source and said display surface, means for comparing the energization of said movement causing means and said sensed relative position to establish an indication of an error therebetween, and means for moving said light beam of said light source with respect to said light source to position said light beam to compensate for said error indication.

4. An error compensating follow-up system for a plotting device employing a cathode ray tube and a display surface and including means for preprograming relative movements therebetween comprising, means for moving said cathode ray tube in respect to said display surface, means for energizing said movement producing means, means for comparing the relative position of said movement causing means and the energization from said energizing means including means for sensing an error therebetween, and means for applying said error to the deflection means of said cathode ray tube to move the electron beam thereof to compensate for said sensed error and to said means for energizing said movement-producing means.

5. A seismic data plotting apparatus including a movable display surface, a movable oscillographic light source including a universally movable light beam, said light beam being directed toward said display surface for plotting said seismic data thereon, means for moving said display surface and said light source to control relative positioning thereof in accordance with preprogramed signals representing subsurface earth formation seismic velocity data, means for energizing said light source to control said light beam in accordance with said seismic data to be plotted, means for generating a signal determined by the present position of both said display surface and said light source, comparator means including an error detector for comparing said preprogramed seismic velocity data signals and said generated present position signals and for generating error signals representing differences in said compared signals, means for respectively energizing said means for moving said display surface and said light source with said error signals, and means for moving said light beam with respect to said light source in accordance with said error signal to instantaneously compensate the position for plotting said seismic data on said display surface for errors between said preprogramed data signals and said present position signals.

References Cited in the file of this patent
UNITED STATES PATENTS

| | | |
|---|---|---|
| 2,771,593 | Straehl | Nov. 20, 1956 |
| 2,861,507 | Palmer | Nov. 25, 1958 |